Figure 1:
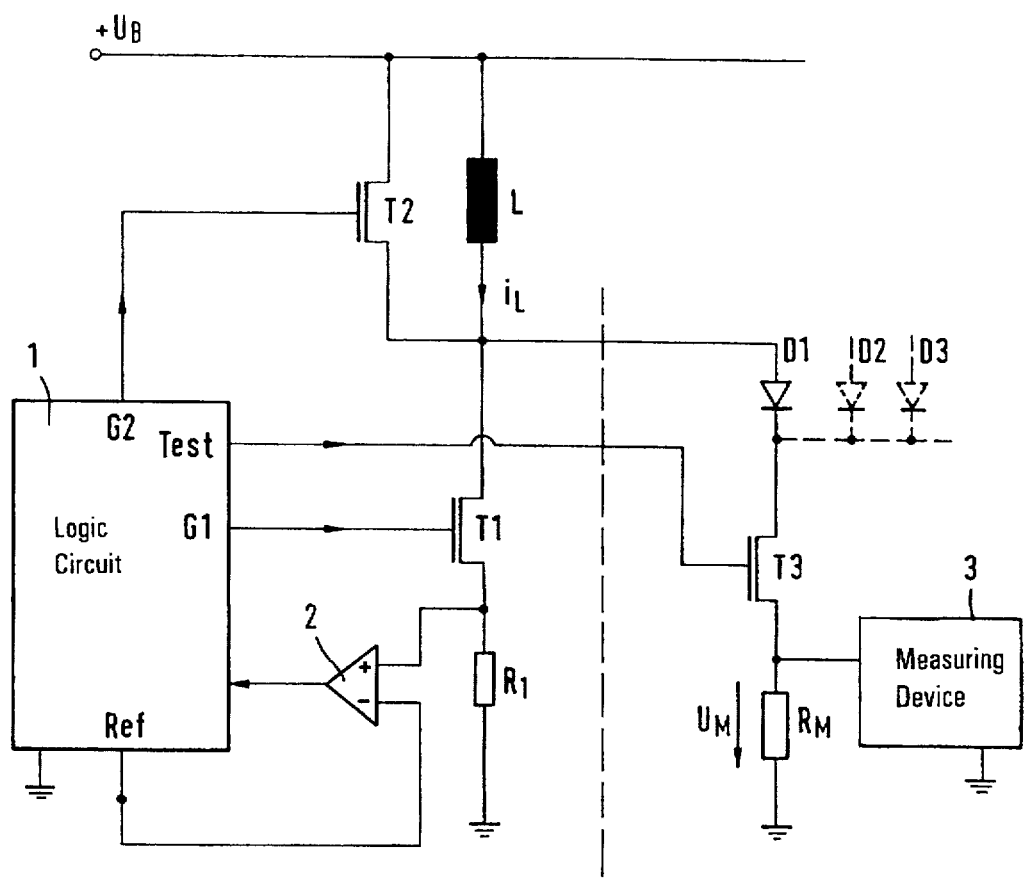

United States Patent
Zydek et al.

[11] Patent Number: 5,763,963
[45] Date of Patent: Jun. 9, 1998

[54] CIRCUIT ARRANGEMENT FOR MONITORING A CONTROL CIRCUIT

[75] Inventors: Michael Zydek, Langgons; Wolfgang Fey, Niedernhausen, both of Germany

[73] Assignee: ITT Manufacturing Enterprises Inc., Wilmington, Del.

[21] Appl. No.: 809,504

[22] PCT Filed: Sep. 18, 1995

[86] PCT No.: PCT/EP95/03656

§ 371 Date: Jun. 16, 1997

§ 102(e) Date: Jun. 16, 1997

[87] PCT Pub. No.: WO96/09190

PCT Pub. Date: Mar. 28, 1996

[30] Foreign Application Priority Data

Sep. 24, 1994 [DE] Germany .......................... 44 34 179.2

[51] Int. Cl.⁶ .................................................. H02M 3/08
[52] U.S. Cl. ................... 307/130; 307/125; 327/108; 327/110; 327/131; 363/41; 361/93; 361/152
[58] Field of Search ........................ 307/130, 125, 307/108, 110, 139; 363/41; 323/285; 361/152, 93, 100, 31

[56] References Cited

U.S. PATENT DOCUMENTS

| | | | |
|---|---|---|---|
| 4,178,619 | 12/1979 | Seiler et al. | 361/93 |
| 4,400,756 | 8/1983 | Cave et al. | 361/152 |
| 4,736,267 | 4/1988 | Kartlmann et al. | 323/285 |
| 5,140,515 | 8/1992 | Menniti et al. | 363/98 |
| 5,481,446 | 1/1996 | Timmins | 363/41 |
| 5,696,658 | 12/1997 | Pietrobon | 361/93 |

FOREIGN PATENT DOCUMENTS

| | | |
|---|---|---|
| 3503289 | 8/1985 | Germany . |
| 3629186 | 3/1988 | Germany . |
| 3722527 | 1/1989 | Germany . |
| 3727283 | 2/1989 | Germany . |
| 3826087 | 2/1990 | Germany . |
| 3835662 | 4/1990 | Germany . |
| 3942164 | 6/1990 | Germany . |
| 3942167 | 6/1990 | Germany . |
| 3921329 | 1/1991 | Germany . |
| 3927972 | 2/1991 | Germany . |
| 3928651 | 3/1991 | Germany . |
| 4011217 | 10/1991 | Germany . |
| 4101492 | 7/1992 | Germany . |
| 4117099 | 10/1992 | Germany . |
| 4142569 | 6/1993 | Germany . |
| 4204912 | 8/1993 | Germany . |
| WO9609190 | 3/1996 | WIPO . |

OTHER PUBLICATIONS

English Translation of the International Preliminary Examination Report of International Application No. PCT/EP95/03656.

*Primary Examiner*—William M. Shoop, Jr.
*Assistant Examiner*—Albert W. Paladini
*Attorney, Agent, or Firm*—J. Gordon Lewis; Thomas N. Twomey

[57] ABSTRACT

A circuit arrangement for monitoring a control circuit, which has a driver transistor with an inductive load and a second transistor in a circuit branch parallel to the inductive load, includes an additional, external current measuring device. A switching element, in particular a transistor and an ohmic measuring resistor, is provided parallel to the driver transistor. At a test instant, the current flowing through the inductive load is diverted to the measuring device and induces a voltage at the measuring resistor which is indicative of the status of the control circuit.

6 Claims, 1 Drawing Sheet

CIRCUIT ARRANGEMENT FOR MONITORING A CONTROL CIRCUIT

The present invention relates to a circuit arrangement for monitoring a control circuit including a driver transistor which is used to adjust in an inductive load, for example, a coil, a predetermined average current value by a clocked, pulse-width modulated actuation (PWM) of the driver transistor, and wherein current flow is induced by the inductive load in the blocking intervals of the driver transistor during the PWM-actuation through a circuit branch which is parallel to the inductive load and has a switch.

Prior art hydraulic brake systems with electronic anti-lock control (ABS) or traction slip control (TCS) include electrically or electromagnetically operable hydraulic valves actuated by way of drivers having driver transistors in their output stages. This arrangement is an example of a control circuit which has a driver transistor with inductive load. The driver transistor is used to control the current flow through the inductive load impedance, i.e. the coil of a hydraulic valve. When the driver transistor is blocked, the energy stored in the coil usually tends to maintain the coil current, with the result of a correspondingly high disconnecting voltage across the coil. Arrangements have been disclosed which conduct the coil current, after the driver transistor is blocked, through a circuit branch that is parallel to the inductive load and includes a switching transistor. An (average) current value may be adjusted on a predetermined level by clocked actuation of the driver transistor, by closing the switch in the circuit branch parallel to the load during the blocking interval of the driver transistor, and by modulating the pulse/pulse-break ratio of the actuating pulses or the actuating clock. In circuits of the type at issue, the predetermined current value or nominal current value is generally defined by comparison with an internal reference value. Complex integrated circuits are used which set both the reference value and the switching thresholds of the transistors that determine the pulse/pulse-break ratio in PWM operations. The difficulty involved is that variations of the reference value and the thresholds will go unnoticed and that errors, in particular discrepancies of the coil current from the nominal value, cannot be detected. Also, the IC internal current monitoring circuits depend on the internal reference value. Therefore, the limit values of the internal current monitoring system will shift in the some manner when the reference value changes.

An object of the present invention is to improve a circuit arrangement of the above type so that the coil current or the current which flows through the inductive load is monitored, irrespective of possible measures inside the circuit, in a simple manner, with little structure and great reliability in operation.

It has been found that this object is achieved by the circuit arrangement described in claim 1. The special circuit features include a current measuring device which is connected parallel to the driver transistor by way of a switching element. During a test period, the current which is induced by the inductive load during the locking intervals is conducted to the current measuring device.

Thus, the present invention provides an additional, external current measuring and current monitoring device which is independent of the actual control circuit and the associated monitoring circuits. The operation of the current measuring and current monitoring device is based on the continued flow of the coil current after the driver transistor is blocked due to the inductance, and on directing the current to the measuring device. When the measuring device includes an ohmic resistor through which the diverted current must flow, a voltage proportional to the current will drop across the resistor. The voltage exceeds a predetermined value or is within predetermined limits only if the control circuit is intact. For example, a voltage drop which is in excess of the supply voltage of the control circuit is likely to occur only due to the disconnection of the inductive load but not due to a short-circuit across this load.

Several favorable embodiments of the present invention are described in the subclaims.

Further details of the present invention can be seen in the following description of an embodiment, making reference to the accompanying drawing. In the drawing, FIG. 1 is a schematically simplified view of the basic components of a circuit arrangement of the present invention. FIGS. 2A–2D show the current variation through the inductive load and the synchronous switching condition of the transistors of the circuit arrangement of FIG. 1.

In the embodiment of the present invention as shown in FIG. 1, a driver transistor T1 is controlled by a logic circuit 1 by way of its output G1. Driver trasistors T1 of this type are used to control the hydraulic valves of an anti-lock brake system or other electronically controlled hydraulic systems, for example. The load of the driver transistor T1 is a coil, i.e., a predominantly inductive load. The inductive resistor of the hydraulic coil is represented by reference numeral "L" in FIG. 1.

A very low-ohmic resistor $R_1$ in the source connection S of the transistor T1 in the embodiment of FIG. 1 is used to determine the current which flows through the transistor T1. As soon as the voltage drop across the measuring resistor $R_1$ exceeds a limit value, a comparator 2 compares the voltage drop across $R_1$ with a reference value Ref, and a signal is sent to the logic circuit 1.

A second transistor 2 is provided in a branch circuit parallel to the inductive load L. When the driver transistor T1 is locked and the transistor T2 is simultaneously switched to open by way of the output G2 of the logic circuit 1, the result is that continued flow of the coil current $i_L$ through the transistor T2 is possible after the driver transistor T1 is blocked. This limits the disconnecting voltage across the inductive load L and reduces the energy stored in the coil. If the switch remained open and the transistor T2 blocked, a theoretically optionally high disconnecting voltage would be induced across the inductive load L.

A defined current or average current value is adjusted in the inductive load L by clocked or pulse-width modulated actuation of the driver transistor T1 along with blocking the current path by way of the switch (which is transistor T2 in this arrangement) during the blocking interval of the driver transistor T1. The magnitude of the average value of current flowing through the inductive load L may be set within the circuit, i.e. by correspondingly designing the logic circuit 1, in the above-mentioned manner by way of the measuring resistor $R_1$, the comparator 2 and the reference value Ref. However, variation of the predetermined current value might go unnoticed when a change in the reference value Ref occurs, for example, due to a drop of the supply voltage for the logic circuit 1, or due to other effects.

Therefore, a second, redundant current measuring or current monitoring operation is favorable and, if the current value has a safety-critical aspect, even absolutely necessary for some applications. Therefore, an additional current branch including a switching transistor T3 is provided according to the present invention. Switching transistor T3 is actuated in preset intervals by way of a test output "test" of the logic circuit 1. By actuation of the transistor T3, when the driver transistor T1 is simultaneously blocked and actuation of the transistor T2 is simultaneously prevented, the coil current or the current $i_L$ which flows through the inductive load L is taken by transistor T3. Current $i_L$ causes a voltage drop across the ohmic measuring resistor $R_M$ indicating directly the condition of the driver circuit, the coil L of the hydraulic valve and, more particularly, the magnitude of the coil current $i_L$ or the average current value. This is because the voltage drop across $R_M$ is determined almost exclusively by the magnitude of the coil current $i_L$ and the resistance of the measuring resistor $R_M$.

Favorably, the resistor $R_M$ is rated so that a voltage $U_M$, which is in excess of the supply voltage $+U_B$, will decline across the resistor in order to disclose immediately that this is due to the effect of the energy stored in the inductance L. If there is a defect, even in the event of a short-circuit in relation to the supply voltage $+U_B$, it is impossible to reach a value in excess of the voltage $+U_B$. A measuring device 3 is used to evaluate the voltage $U_M$ which declines across the resistor $R_M$.

Current supply to the testing and measuring device (T3, $R_M$, 3) takes its course through a decoupling diode D1 to permit the monitoring of other driver circuits or inductive loads (not shown), which are connected by way of decouplings diodes D2, D3 (shown in dotted lines), by way of the same measuring devices.

Figure 2A:
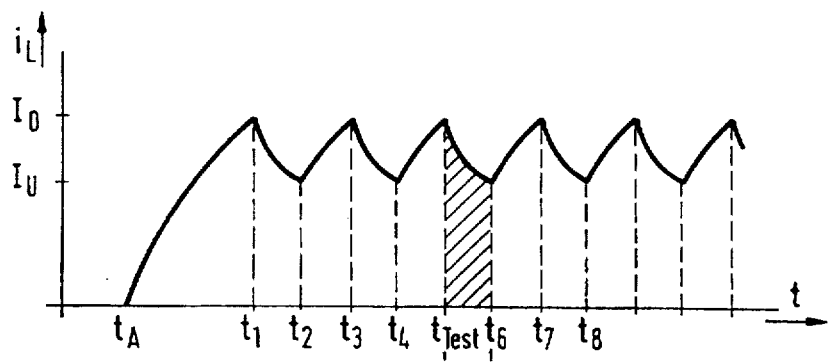
Figure 2B:
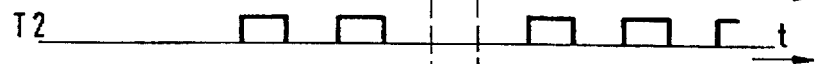
Figure 2C:
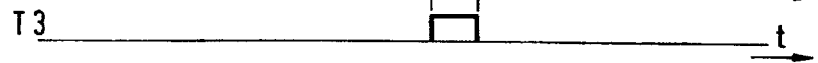
Figure 2D:
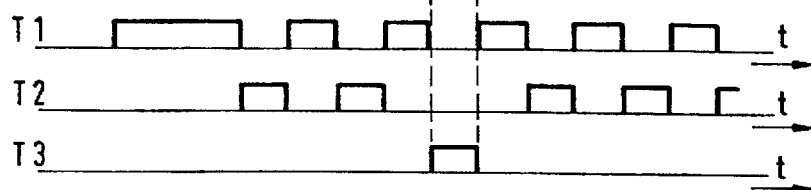

The embodiments of FIGS. 2A to 2D illustrate the operations described above. FIG. 2A shows the coil current $i_L$ during clocked actuation of the driver transistor T1. The actuation of the driver transistor T1 commences at time $t_A$. The top current limit value $I_o$ determined by way of the source resistor $R_1$, the comparator 2 and the reference value Ref is reached at time $t_1$. Consequently, the transistor T1 is blocked at time $t_1$, and the transistor T2 in the branch circuit parallel to the inductive load L is simultaneously switched to the open condition. The actuating signals for the transistors T1 and T2 are shown in FIGS. 2B and 2C.

The coil current $i_L$ is now conducted across the transistor T2, with the current decreasing. The driver transistor T1 is switched on again, and T2 is switched off, after a defined preset interval, i.e., at time t. These operations are repeated in the predetermined actuating clock.

According to the present invention, the magnitude of the coil current $i_L$ is tested externally at defined points of time, initiated by recurrent events, for example, after each start of the engine. This test is performed at time $t_{test}$ in the embodiment shown. At this time, which coincides with the blocking of the driver transistor T1, actuation of the transistor T2 is stopped (see FIG. 2C), and transistor T3 is actuated (see FIG. 2D). Thus, the coil current $i_L$ flows through the diode D1, the transistor T3 and the measuring resistor $R_M$. The voltage drop $U_M$ across $R_M$ permits identifying whether the driver circuit, the supply voltage, etc., is intact.

Favorably, it is monitored whether the voltage drop $K_M$ across $R_M$ ranges within predetermined limits. The bottom limit, as has been described above, should be in excess of the supply voltage $+U_B$ to permit monitoring the condition and the activation of the inductance L. To simplify the monitoring circuit, it may be sufficient to monitor the exceeding of a predetermined minimum value of the voltage drop $U_M$ across $R_M$. The time constant of the voltage drop after the commencement of the test procedure $(t_{test}-t_6)$ is identical with, or very similar to, the time constant during the reduction of energy by way of T2 in the illustration of FIG. 2A. This applies only to the embodiment shown. A different time pattern during the test period is also acceptable in other cases.

One embodiment of the measuring device of the present invention involves identifying the peak current value at time $t_{test}$ or the corresponding voltage drop across the measuring resistor $R_M$. This is easily possible by known circuits according to the peak-hold principle.

We claim:

1. Circuit arrangement for monitoring a control circuit including a driver transistor which is used to adjust in an inductive load a predetermined average current value by a clocked, pulse-width modulated actuation of the driver transistor, and wherein current flow is initiated by the inductive load in the blocking intervals of the driver transistor through a circuit branch which is parallel to the inductive load and has a switch.

wherein a current measuring device is connected parallel to the driver transistor by way of a switching element, and in that in a test period the current through the inductive load is conducted to the current measuring device during blocking intervals.

2. Circuit arrangement as claimed in claim 1, wherein both the switch in the circuit branch parallel to the inductive load and the switching element for activating the current measuring device are configured as switching transistors.

3. Circuit arrangement as claimed in claim 2, wherein the course of the current which is induced by the inductive load in the blocking intervals is diverted by closing the switching transistor that is inserted into the parallel circuit branch and by actuating the transistor that leads to the current measuring device.

4. Circuit arrangement as claimed in claim 1, wherein the current measuring device includes an ohmic measuring resistor, across which there is a drop of a voltage, exceeding the supply voltage of the control circuit, in the test period during fail-free operations.

5. Circuit arrangement as claimed in claim 4, wherein the voltage drop $(K_M)$ across the measuring resistor $(R_M)$ is monitored with respect to maintaining a bottom and a top limit value.

6. Circuit arrangement as claimed in claim 1, wherein a number of control circuits are connected to a joint current measuring device by way of decoupling diodes.

* * * * *